United States Patent
Bita et al.

(10) Patent No.: US 7,421,538 B2
(45) Date of Patent: Sep. 2, 2008

(54) STORAGE CONTROL APPARATUS AND CONTROL METHOD THEREOF

(75) Inventors: Joichi Bita, Kawasaki (JP); Daiya Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 10/717,335

(22) Filed: Nov. 19, 2003

(65) Prior Publication Data

US 2004/0103247 A1 May 27, 2004

(30) Foreign Application Priority Data

Nov. 22, 2002 (JP) ............................. 2002-338901

(51) Int. Cl.
*G06F 12/16* (2006.01)
*G06F 12/00* (2006.01)

(52) U.S. Cl. .................. 711/118; 711/100; 711/117; 711/119; 711/120; 711/124

(58) Field of Classification Search ................... None
See application file for complete search history.

(56) References Cited

U.S. PATENT DOCUMENTS

| | | | |
|---|---|---|---|
| 5,579,474 A | | 11/1996 | Kakuta et al. |
| 5,682,513 A | * | 10/1997 | Candelaria et al. .......... 711/113 |
| 5,692,155 A | | 11/1997 | Iskiyan et al. |
| 5,712,970 A | * | 1/1998 | Arnott et al. .................... 714/6 |
| 5,720,028 A | | 2/1998 | Matsumoto et al. |
| 5,761,705 A | * | 6/1998 | DeKoning et al. .......... 711/113 |
| 5,819,054 A | | 10/1998 | Ninomiua et al. |
| 5,864,854 A | * | 1/1999 | Boyle ........................... 707/10 |
| 5,870,537 A | * | 2/1999 | Kern et al. ....................... 714/6 |
| 5,974,506 A | * | 10/1999 | Sicola et al. ................. 711/120 |
| 5,987,566 A | * | 11/1999 | Vishlitzky et al. ........... 711/114 |
| 6,012,119 A | | 1/2000 | Ninomiua et al. |
| 6,173,377 B1 | * | 1/2001 | Yanai et al. .................. 711/162 |
| 6,247,012 B1 | * | 6/2001 | Kitamura et al. .............. 707/10 |
| 6,304,980 B1 | * | 10/2001 | Beardsley et al. .............. 714/6 |
| 6,321,298 B1 | * | 11/2001 | Hubis .......................... 711/124 |

(Continued)

FOREIGN PATENT DOCUMENTS

JP 2-017550 1/1990

(Continued)

OTHER PUBLICATIONS

Rowson et al., "Interface-Based Design", 1997, ACM Press, Proceedings of the 34th annual conference on Design automation, vol. 00, pp. 178-183.*

(Continued)

*Primary Examiner*—Sam Dillon
(74) *Attorney, Agent, or Firm*—Greer, Burns & Crain, Ltd.

(57) ABSTRACT

A storage control apparatus controls physical disks according to the host access using a pair of controllers, while mirroring processing is decreased when data is written to a cache memory and high-speed operation is enabled. The mirror management table is created with allocating the mirror area of the cache memory of the other controller, and acquisition of a mirror page of the cache memory of the other controller is executed referring to the mirror management table without an exchange of mirror page acquisition messages between the controllers.

15 Claims, 9 Drawing Sheets

U.S. PATENT DOCUMENTS

| | | | | |
|---|---|---|---|---|
| 6,408,370 | B2 * | 6/2002 | Yamamoto et al. | 711/167 |
| 6,567,889 | B1 * | 5/2003 | DeKoning et al. | 711/114 |

FOREIGN PATENT DOCUMENTS

| | | |
|---|---|---|
| JP | 6-067979 | 3/1994 |
| JP | 6-202817 | 7/1994 |
| JP | 7-20994 | 1/1995 |
| JP | 7-160432 | 6/1995 |
| JP | 8-305500 | 11/1996 |
| JP | 8-335144 | 12/1996 |
| JP | 08-030398 | 2/1998 |
| JP | 10-105467 | 4/1998 |
| JP | 10-198607 | 7/1998 |
| JP | 2000-10901 | 1/2000 |
| JP | 2001-014112 | 1/2001 |
| JP | 2002-132453 | 5/2002 |

OTHER PUBLICATIONS

Tam et al, "A Taxonomy-Based Comparison of Several Distributed Shared Memory Systems", 1990, ACM Press, ACM SIGOPS Operating Systems Review vol. 24 Issue 3, pp. 40-67.*

Li et al., "Evaluation of Memory System Extensions", 1991, ACM Press, Proceedings of the 18th annual international symposium on Computer architecture, pp. 84-93.*

* cited by examiner

STORAGE CONTROL APPARATUS AND CONTROL METHOD THEREOF

CROSS-REFERENCE TO RELATED APPLICATIONS

This application is based upon and claims the benefit of priority from the prior Japanese Patent Application No. 2002-338901, filed on Nov. 22, 2002, the entire contents of which are incorporated herein by reference.

BACKGROUND OF THE INVENTION

1. Field of the Invention

The present invention relates to a storage control apparatus for managing data using such a physical disk as a magnetic disk and the method thereof, and more particularly to a storage control apparatus having duplex controller, and the method thereof.

2. Description of the Related Art

In storage device using such a storage medium as a magnetic disk, magneto-optical disk and optical disk, the storage medium is actually accessed by the request of the data processing apparatus. When a data processing apparatus uses large capacity data, a storage apparatus using a plurality of storage device and control apparatus is used.

Figure 12:
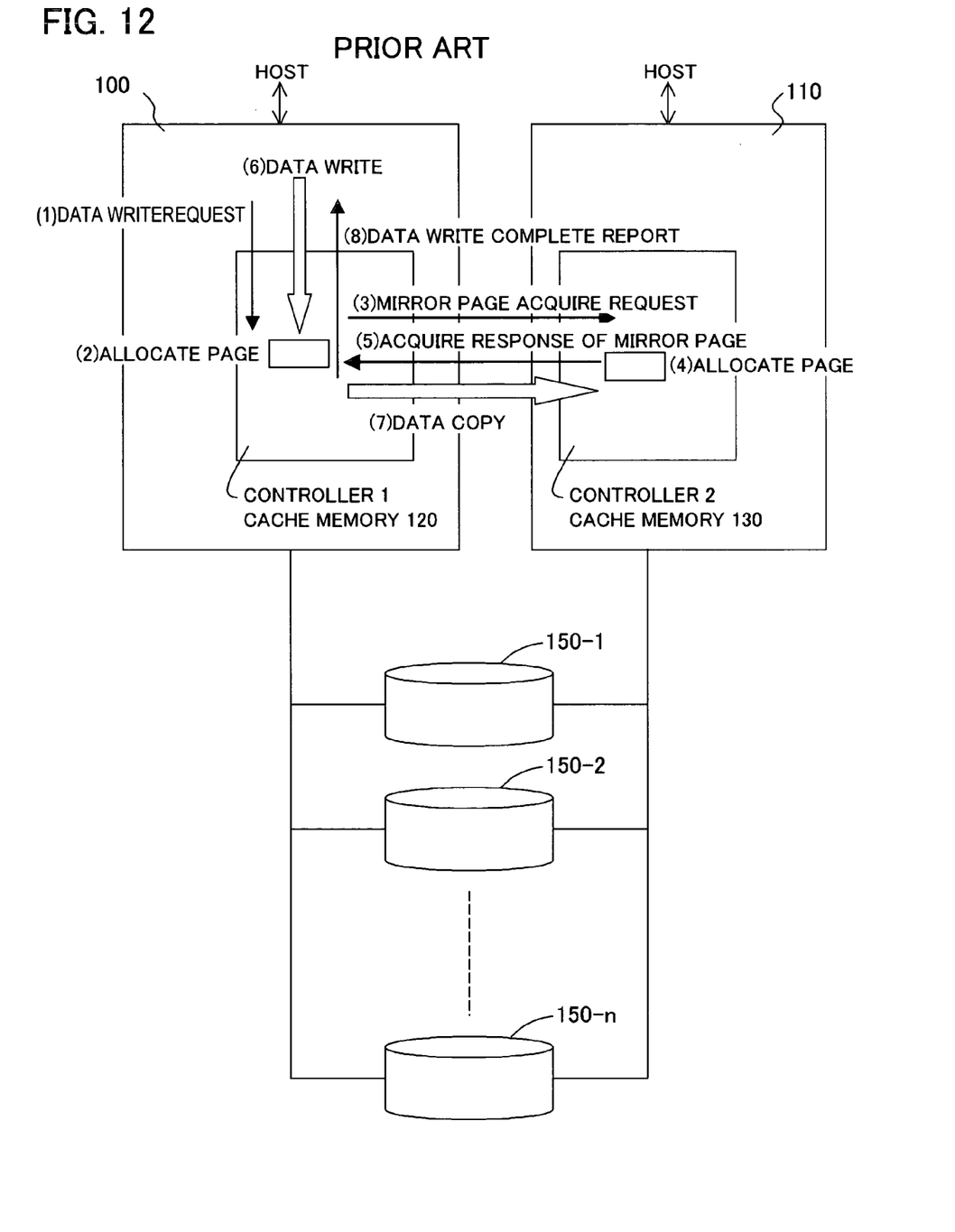
FIG. 12 is a diagram depicting the data write processing of prior art.

In such a storage apparatus, a redundant configuration is adopted to improve the reliability of stored data and the reliability of the apparatus. FIG. 12 is a diagram depicting prior art.

As FIG. 12 shows, a plurality of storage device (disk device) 150-1 to 150-n are connected to a pair of controllers 100 and 110 which are connected to a host respectively. For the redundant configuration, a multiplexed disk configuration called a RAID (Redundant Array of Inexpensive (or Independent) Disks) is normally used for the disk apparatus 150-1 to 150-n. The controller is duplex, that is, comprised of a pair of controllers 100 and 110.

Therefore normally both controllers 100 and 110 share the disk device 150-1 to 150-n for control, and even if one controller (e.g. 100) fails, the other controller (e.g. 110) can control the disk apparatus 150-1 to 150-n.

Also to improve the response of host access, the cache memories 120 and 130 are disposed in the controllers 100 and 110. These cache memories 120 and 130 have a read/write area and a mirror area, and in the read/write area, a part of the data of the disk device, which the controller itself takes charge of, and the write data from the host, are stored.

In other words, for read access from the host, the data of the cache memory is read and transferred without actually accessing the disk device if the target data is stored in the cache memories 120 and 130. For write access from the host, the write data is written to the cache memories 120 and 130 and writing is completed. The write data of the cache memories 120 and 130 is written back to the target disk drive at idle time during processing.

The mirror area is for one controller 100 or 110 to copy the write data written in cache memory 120 or 130 of the self to the cache memory 130 or 120 of the other controller 110 or 100 for duplex controllers. By this, it can prevent to loose data since even if one controller fails, the other controller holds the write data before the write back of the one controller in the mirror area.

This mirroring of a write data has been performed as follows. Here the case when write access is sent to the controller 100 will be described, but the case when write access is sent to the controller 110 is the same as well When a data write request is received from the host, ([1]), the controller 100 allocates a write page of the cache memory 120 ([2]). Then the controller 100 sends a request to acquire a mirror page of the cache memory 130 to the controller 110 ([3]). The controller 110 allocates the mirror page of the cache memory 130 ([4]), and then notifies acquisition of the mirror page to the controller 100 ([5]).

Then the data from the host is written to the allocated page of the cache memory 120 ([6]). The data written in the cache memory 120 is copied to the allocated mirror page of the controller 110 ([7]). And after copying completes, the controller 100 notifies a data write completion report to the host ([8]).

In this way, mirroring of the write data has been performed (e.g. Japanese Patent Application Laid-Open No. 2002-132453).

In prior art, the controllers 100 and 120 must exchange the messages of an acquisition request and an acquisition response to acquire the mirror page, so load on the hardware between controllers is high. This makes it difficult to improve performance when the write data is mirrored.

Also to acquire the mirror page, program operation is necessary for the other controller (controller 110 in FIG. 12), so load is generated at the other controller even though processing of one controller. Therefore, it is difficult to improve performance using two controllers.

SUMMARY OF THE INVENTION

With the foregoing in view, it is an object of the present invention to provide a storage control apparatus and a control method for executing mirroring of write data with decreasing load between controllers.

It is another object of the present invention to provide a storage control apparatus and a control method thereof for executing mirroring of write data with decreasing load of the other controller.

It is still another object of the present invention to provide a storage control apparatus and control method thereof for executing mirroring of write data at high-speed.

To achieve these objects, the storage control apparatus of the present invention has a first controller which has a first cache memory and is in charge of a first storage device out of a plurality of storage device, and a second controller which has a second cache memory and is in charge of a second storage device out of a plurality of storage device. Furthermore, the first controller further has a first mirror management table for managing the mirror area of the second cache memory, and the second controller further has a second mirror management table for managing the mirror area of the first cache memory. And when the first controller receives a data write request from the requesting apparatus, the first controller allocates a page in a read/write area of the first cache memory, acquires a storage page in the mirror area of the second cache memory referring to the first mirror management table, writes the write data from the requesting apparatus to the page allocated in the read/write area of the first cache memory, and copies the write data to the acquired page in the mirror area of the second cache memory.

The storage control method of the present invention is a storage control method for one of a pair of controllers to access a storage device according to a data access request from a requesting apparatus, having steps of: allocating a page in a read/write area of a first cache memory disposed in one controller of the pair when the one controller received a data write request from the requesting apparatus; acquiring a storage page in the mirror area of a second cache memory referring to a first mirror management table which is disposed in the one controller for managing the mirror area of the second cache memory of the other controller; writing the write data from the requesting apparatus to the page allocated in the read/write area of the first cache memory; and copying the write data to the acquired page in the mirror area of the second cache memory after the writing.

In the present invention, one controller holds the mirror management table in the mirror area of the cache memory of the other controller and acquires the mirror page, so an exchange of mirror page acquisition messages between the controllers is unnecessary, and mirroring of write data is possible with decreasing the load of the hardware between controllers, particularly of the CPU. Also program operation of the other controller is unnecessary, and performance of the controller itself can be improved.

In the storage control apparatus of the present invention, it is preferable that the first and second controllers mutually notify the sizes of the first and second cache memories, allocate the mirror areas of the first and second cache memories according to the sizes, and create the first and second mirror management tables.

It is preferable that the storage control method of the present invention further has a step of notifying the sizes of the first and second cache memories between the pair of controllers, allocating the mirror areas of the first and second cache memories according to the sizes, and creating the first and second mirror management tables.

In this aspect of the present invention, the mirror area of the cache memory of the other controller is allocated and the mirror management table is created, so the mirror area according to the size of the cache memory of the other controller can be set, and an exchange of mirror page acquisition messages between the controllers is unnecessary.

In the storage control apparatus of the present invention, it is preferable that the first controller writes back the data, which is written in the page allocated in the read/write area of the first cache memory, to the storage device, then releases the acquired page of the first mirror management table.

It is preferable that the storage method of the present invention further has a step of writing back the data, which is written in the page allocated in the read/write area of the first cache memory, to the storage device, and a step of releasing the acquired page of the first mirror management table when the write back completes.

In this aspect of the present invention, the mirror page is released in the management table for managing the mirror area when a write back is executed, so the mirror release by the other controller is possible without any operation of the other controller.

In the storage control apparatus, it is preferable that when the first controller is degraded, the second controller takes charge of the storage device which the first controller is in charge of, and links the copy page in the mirror area of the second cache memory to the read/write area.

It is preferable that the storage control method of the present invention further has a step of taking charge of the storage device which the one controller is in charge of by another controller when the one controller is degraded, and linking the copy page in the mirror area of the second cache memory to the read/write area of the second cache memory.

By this, when one controller is degraded, the other controller can take charge of the mirror data and process it, instead of the one controller.

In the storage control apparatus and method of the present invention, it is preferable that the second controller disables read/write processing to the mirror area of the second cache memory. By this, the degraded controller can guarantee the mirror area when it is started up.

In the storage control apparatus and method of the present invention, it is preferable that when the first controller received a data write request for a plurality of pages from the requesting apparatus, the first controller allocates a plurality of pages in the read/write area of the first cache memory, acquires a plurality of storage pages in the mirror area of the second cache memory referring to the first mirror management table, writes the write data from the requesting apparatus to the allocated page in the read/write area of the first cache memory, copies it to the acquired page in the mirror area of the second cache memory, and writes the data of the next page to the next page allocated in the read/write area of the first cache memory during the copying.

By this, write processing of continuous pages can be performed at high-speed with executing mirroring.

In the storage control apparatus or method of the present invention, it is preferable that each one of the first and second controllers further has a control unit for controlling the cache memory and the storage device, and a node channel circuit for performing communication between the controllers.

In the storage control apparatus or method of the present invention, it is preferable that the control unit instructs the node channel circuit to perform a DMA transfer of the data of the page, allocated in the read/write area of the first cache memory, to the acquired page in the mirror area of the second cache memory, and performs copying.

Therefore the copying load of the control unit can be decreased, and mirroring processing can be executed with a minimum load.

DESCRIPTION OF THE PREFERRED EMBODIMENTS

Embodiments of the present invention will now be described in the sequence of storage system; write processing, write back processing, degrade processing and other embodiments.

[Storage System]

Figure 1:
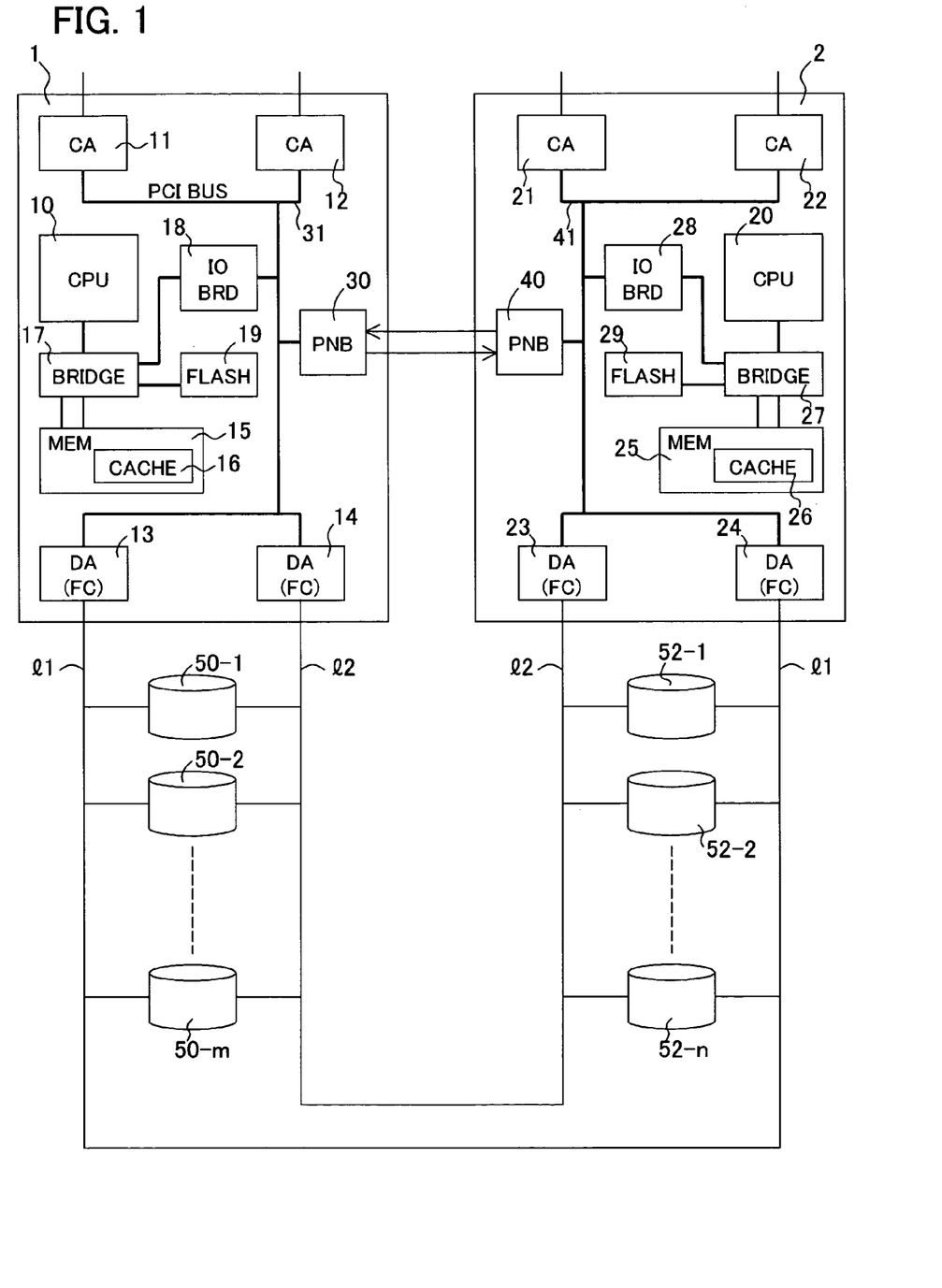
FIG. 1 is a block diagram depicting the storage system of an embodiment of the present invention.

FIG. 1 is a block diagram depicting the storage system of an embodiment of the present invention, and shows a RAID (Redundant Array of Inexpensive Disks) system using a magnetic disk. As FIG. 1 shows, the storage system comprises a pair of magnetic disk controllers (hereafter called controllers) 1 and 2, and many magnetic disk devices 50-1 to 50-m, 52-1 to 52-n, which are connected to the pair of controllers 1 and 2 via the lines 11 and 12.

The controllers 1 and 2 are connected to the host and the server directly or via network equipment, and allow a reading/writing of mass data of the host and the server to/from the RAID disk drive (magnetic disk apparatus) at high-speed and at random. The pair of controllers 1 and 2 have identical configurations, and are comprised of the function module CA (Channel Adaptor) 11, 12, 21 and 22, CM (Centralized Module) 10, 15 to 19, 20, 25 to 29, and DA (Device Adaptor) 13, 14, 23 and 24.

The CA (Channel Adaptor) 11, 12, 21 and 22 are circuits for controlling the host interface connecting the host, and are comprised of a fiber channel circuit (FC) and DMA (Direct Memory Access) circuits, for example. The DA (Device Adaptor) 13, 14, 23 and 24 are circuits to exchange commands and data with the disk apparatus, for controlling the disk device 50-1 to 50-m and 52-1 to 52-m, and are comprised of a fiber channel circuit (FC) and DMA circuits, for example.

CM (Centralized Module) are comprised of the CPUs 10 and 20, bridge circuits 17 and 27, memories (RAM) 15 and 25, flash memories 19 and 29, and IO bridge circuits 18 and 28. The memories 15 and 25 are backed up by battery, and a part of them are used as the cache memories 16 and 26.

The CPUs 10 and 20 are connected to the memories 15 and 25, flash memories 19 and 29, and IO bridge circuits 18 and 28 via the bridge circuit 17. The memories 15 and 25 are used for the work area of the CPUs 10 and 20, and the flash memories 19 and 29 stores the programs to be executed by the CPUs 10 and 20. The program BIOS (Basic Input/Output System), file access program (read/write program) and RAID management program, for example, are stored. The CPUs 10 and 20 execute these programs, and executes read/write processing and RAID management processing.

The PCI (Peripheral Component Interface) bus 31 connects the CA 11, 12, 21, 22 and DA 13, 14, 23 and 24, and also connects the CPUs 10 and 20 and the memories 15 and 25 via the IO bridge circuit 18. The PCI-node link bridge circuits 30 and 40 are also connected to the PCI bus 31. The PCI-node link bridge circuit 30 of the controller 1 is connected with the PCI-node link bridge circuit 40 of the controller 2, and communicates commands and data between the controllers 1 and 2.

The controller 1 is in charge of the disk devices 50-1 to 50-m, for example, and the controller 2 is in charge of A the disk devices 52-1 to 52-n, for example. In FIG. 1, the disk devices 50-1 to 50-m and 52-1 to 52-n have the configuration of the RAID 5. The configuration of the RAID 1 and RAID 0+1 are also the same.

The cache memories 16 and 26 store a part of the data of the disk device that each cache memory is in charge of, and store the write data from the host. The CPUs 10 and 20, when a read request is received from the host via the CA 11, 12, 21 and 22, determine whether access to the physical disk is necessary referring to the cache memories 16 and 26, and if necessary, request a disk access request to the DAs 13, 14, 23 and 24. The CPUs 10 and 20, when a write request is received from the host, write the write data in the cache memories 16 and 26, and request the write back which scheduled inside the CPU to the DAs 13, 14, 23 and 24.

[Write Processing]

Figure 2:
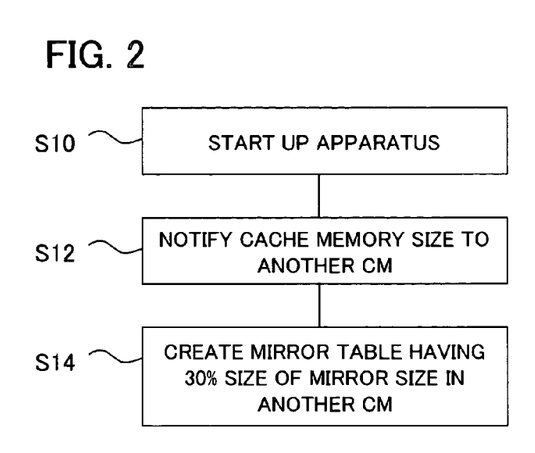
FIG. 2 is a flow chart depicting the mirror area allocation processing of an embodiment of the present invention.

The mirror area allocation processing and write processing of the cache memory will now be described with reference to FIG. 2 to FIG. 6. At first, the mirror area allocation processing of the cache memory will be described with reference to FIG. 2 to FIG. 4. FIG. 2 is a flow chart depicting a mirror area allocation processing of the cache memory according to an embodiment of the present invention, FIG. 3 is a diagram depicting the mirror area allocation in FIG. 2, and FIG. 4 is a diagram depicting the mirror management table in FIG. 3.

Figure 3:
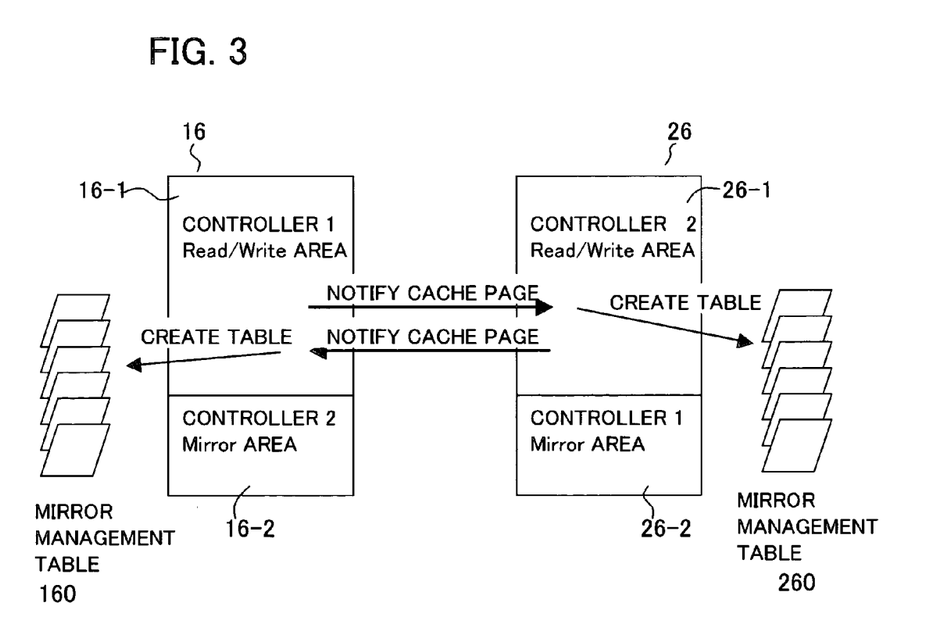
FIG. 3 is a diagram depicting the cache memory of an embodiment of the present invention in FIG. 2.
Figure 4:
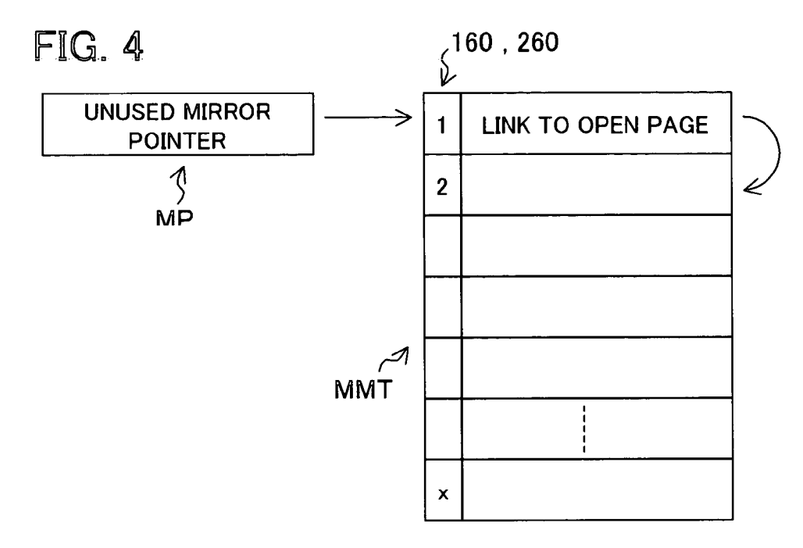
FIG. 4 is a diagram depicting the configuration of the mirror management table in FIG. 3.

As FIG. 3 shows, the cache memory 16 of the controller 1 comprises the read/write area 16-1 of the controller 1, the mirror area 16-2 of the controller 2 and the mirror management table 160. The cache memory 26 of the controller 2 comprises the read/write area 26-1 of the controller 2, mirror area 26-2 of the controller 1 and the mirror management table 260.

The mirror management table 160 stores information for management of the mirror area 26-2 of the cache memory 26, and the mirror management table 260 stores information for management of the mirror area 16-2 of the cache memory 16. As FIG. 4 shows, the mirror management tables 160 and 260 have a page management table MMT, which is comprised of each page 1 to x allocated as a mirror area and the link information to the next open page of each page, and have an unused mirror pointer MP, which indicates the first open page of an unused link.

Mirror area allocation processing will be described with reference to FIG. 3 according to FIG. 2.

(S10) When the apparatus is started up, the mirror area allocation processing is executed.

(S12) At first, the CPU 10 or 20 of the controller 1 or 2 notifies the size (number of pages) of the self cache memory 16 or 26 to the CPU 20 or 10 of the other controller 2 or 1 via the PCI-node bridge circuits 30 and 40.

(S14) The notified CPU 20 or 10 of the controller 2 or 1 allocates 30% of the cache size of the cache memory 16 or 26 of the other controller 1 or 2 as the mirror area 16-1 or 26-1, and creates the mirror management table 160 or 260 for this mirror size.

For example, if the capacity of the cache memory 16 is 100 pages and the capacity of the cache memory 26 is 110 pages, then 33 pages of the cache memory 16 are allocated for the mirror area 16-2 and 30 pages of the cache memory 26 ate allocated for the mirror area 26-2.

Therefore the CPU 10 creates the mirror management table 160 having 33 pages and the CPU 20 creates the mirror management table 260 having 30 pages. 30% here is an example, and another value, such as 20%, can be used.

By fixing the mirror area like this, an acquisition request between controllers can be unnecessary. However, the cache size of each controller may differ depending on the capacity of the physical disk which a controller is in charge of, so the cache size is mutually notified and the fixed ratio thereof is allocated for the mirror areas. Therefore the apparatus can support the difference in cache size. If the cache size is the same, mutual notification of the cache size is unnecessary.

Figure 5:
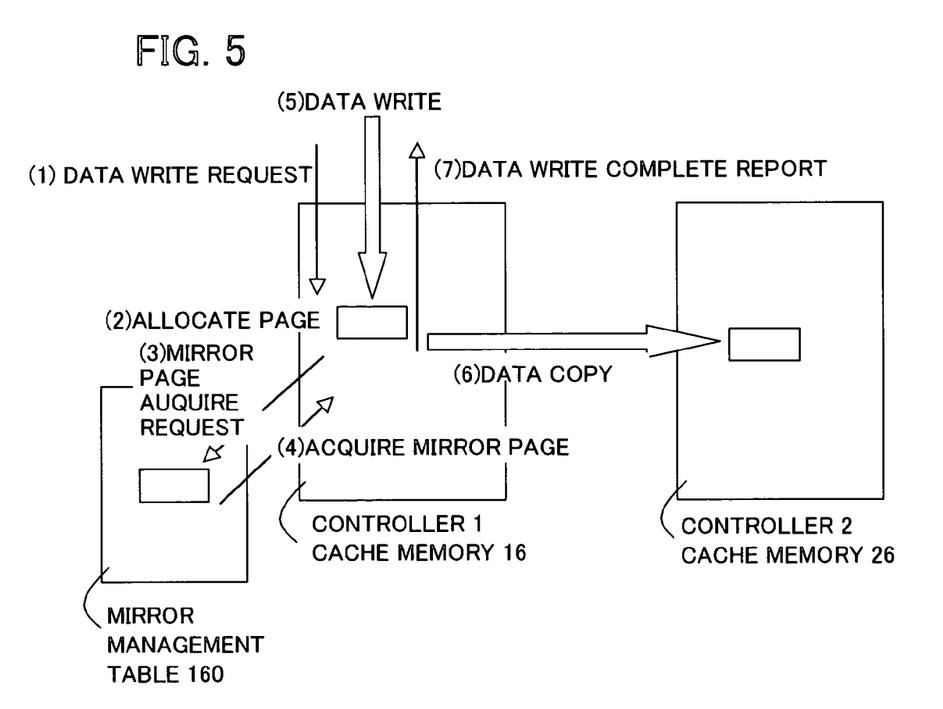
FIG. 5 is a diagram depicting data write operation of an embodiment of the present invention.
Figure 6:
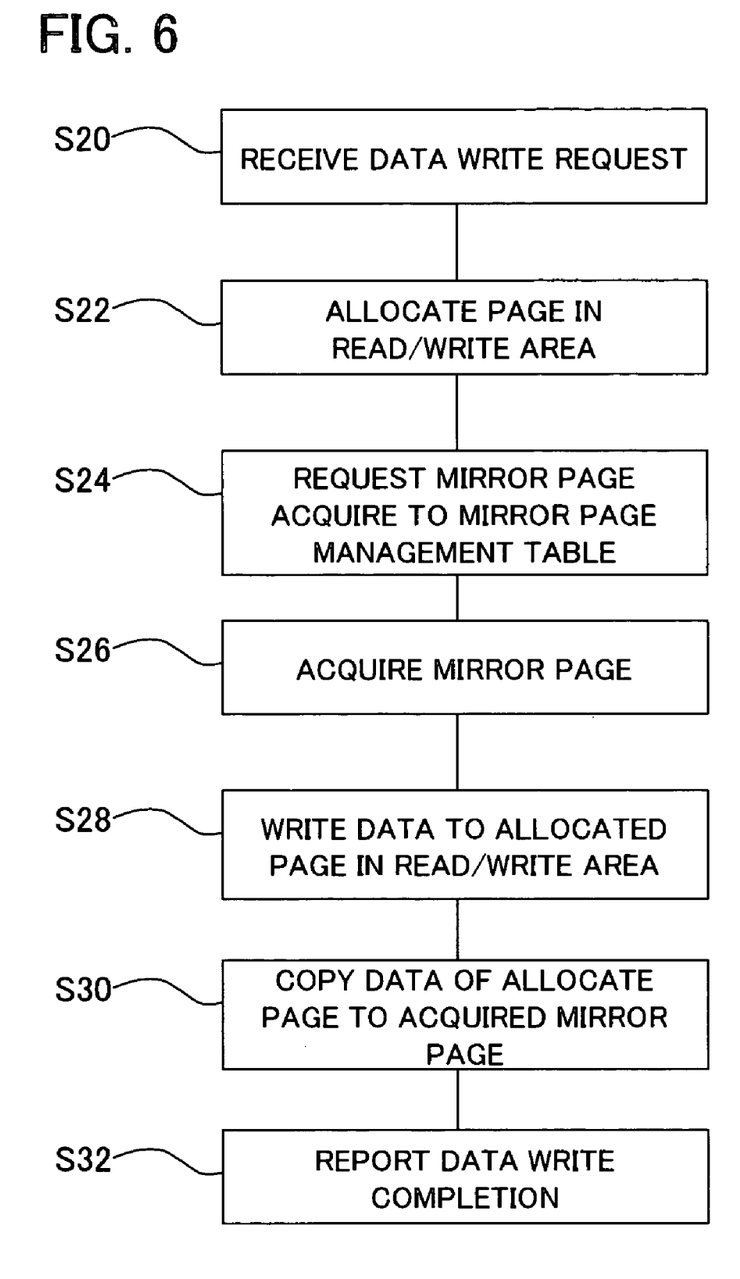
FIG. 6 is a flow chart depicting the data write processing in FIG. 5.

Now write processing will be described with reference to FIG. 5 according to FIG. 6. In FIG. 5, the case when the controller 1 receives the data write request from the host will be described, but the case when the controller 2 receives the data write request from the host is also the same.

(S20) The CPU 10 of the controller 1 receives the data write request from the host via the CAs 11 and 12 ([1]).

(S22) The CPU 10 allocates the write page in the read/write area 16-1 of the cache memory 16 ([2]).

(S24) The CPU 10 sends the mirror page acquisition request of the mirror management table 160 ([3]).

(S26) The CPU 10 acquires the mirror page of the mirror management table 160. In other words, the first open page indicated by the unused mirror pointer MP in FIG. 4 is notified to the CPU 10 as the mirror page. And the unused mirror pointer MP is updated to the page next to the notified mirror page, and the link information of the page management table MMT is updated ([4]).

(S28) The data write enable status occurs and the CPU 10 of the controller 1 writes the write data from the host via the CAs 11 and 12 to the write page allocated in step S22 ([5]). In other words, the CPU 10 instructs the CAs 11 and 12 to execute the DMA transfer of the write data to the write page in the read/write area 16-1.

(S30) After writing the write data to the write page, the CPU 10 copies the data of the write page to the mirror page in the mirror area 26-2 of the cache memory 26 of the controller 2 ([6]). In other words, the CPU 10 instructs the PCI-node bridge circuit 30 to execute the DMA transfer of the data of the write page to the mirror page in the mirror area 26-2 of the cache memory 26 of the controller 2. By this, the data of the write page of the cache memory 16 is copied to the mirror page of the cache memory 26 via the PCI-node bridge circuits 30 and 40.

(S32) After copying completes, the CPU 10 notifies the data write completion report to the host via the CAs 11 and 12 ([7]).

In this way, the mirror management table is created with allocating the mirror area of the cache memory of the other controller, so an exchange of mirror page acquisition messages between the controllers is unnecessary, and mirroring of the write data is possible with decreasing the load of hardware between controllers, particularly of the CPU. Also program operation of the other controller is unnecessary, and performance of the controller itself can be improved.

[Write Back Processing]

Figure 7:
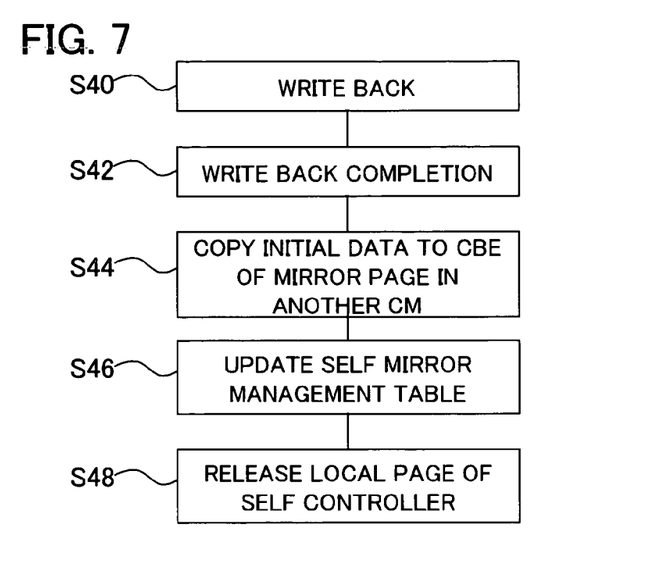
FIG. 7 is a flow chart depicting the write back processing in FIG. 1.
Figure 8:
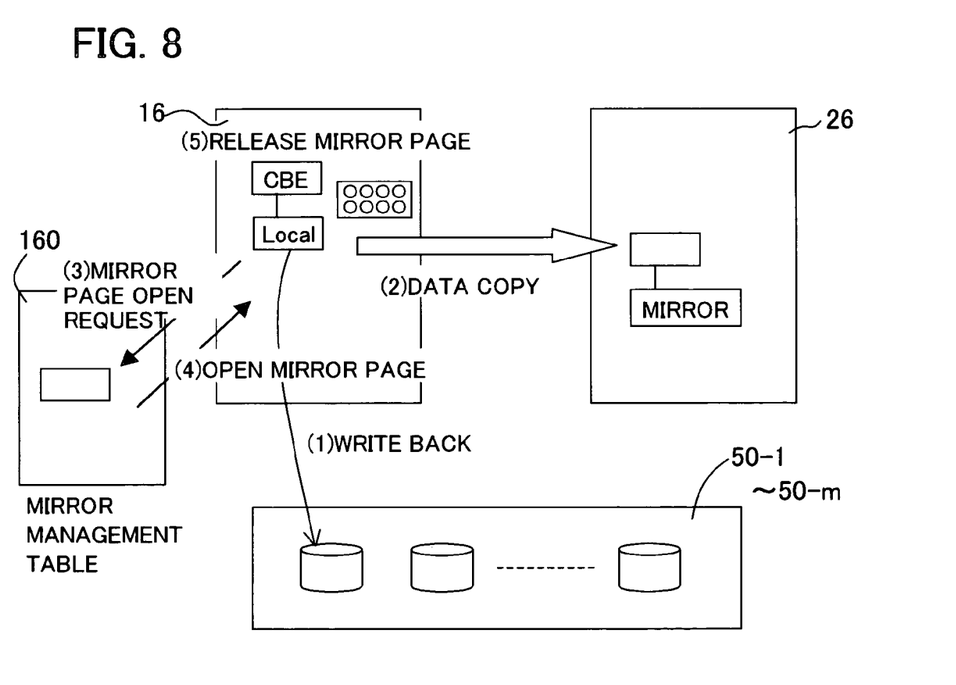
FIG. 8 is a diagram depicting operation of the write back processing in FIG. 7.

Now write back processing, which is writing write data written in the cache memory to a physical disk, will be described. FIG. 7 is a flow chart depicting the write back processing of an embodiment of the present invention, and FIG. 8 is a diagram depicting the write back processing. Write back processing will be described with reference to FIG. 8 according to FIG. 7. In FIG. 8, the write back of the cache memory 16 of the controller 1 will be described, but the write back of the cache memory 26 of the controller 2 is also the same.

(S40) Write back is executed according to a predetermined schedule in the background of host access processing. The CPU 10 instructs a write back of the target page (herein called local page) in the read/write area 16-1 of the cache memory 16 to the DAs 13 and 14. By this, DAs 13 and 14 read the data of the local page and write the data to the corresponding physical disk 50-1 to 50-*m* ([1]).

(S42) After writing completes, DAs 13 and 14 notify write back completion to the CPU 10.

(S44) The CPU 10 copies the initial data (e.g. all "0") to the CBE (Cache Block Element) of the mirror page of the cache memory 26 corresponding to this local page ([2]). By this, the attributes of the mirror page become free. In the CBE of the mirror page, the data indicating the mirror page configuration is written.

(S46) After this initial copying, the CPU 10 sends a release request for this mirror page of the mirror management table 160 ([3]) and releases the mirror page ([4]). In other words, the CPU 10 updates the first open page indicated by the unused pointer MP in FIG. 4 to the mirror page to be released, and updates the link information of the released mirror page of the page management table MMT in the open page which has been the first page.

(S48) Then this local page is released from mirror status. In other words, the mirror information of the CBE of the local page is initialized. By this, write back processing ends.

In this way, the mirror page is released from the mirror management table 160 by a write back. Also the CBE of the mirror page is made operational, so the status of the mirror page of the cache memory of the other controller can be easily changed to release status.

[Degrade Processing]

Now processing when one controller is degraded (failed) will be described with reference to FIG. 9. Here an example when the controller 1 is degraded will be described, but the case when the controller 2 is degraded is also the same.

When the controller 1 is degraded, the controller 2 takes charge of the physical disks 50-1 to 50-*m* which the controller 1 has been in charge of, in addition to the physical disks 52-1 to 52-*n* which the controller 2 itself is in charge of. Therefore the controller 2 must take charge of the entire mirror area 26-2 of the cache memory 26 (mirror data of the controller 1).

Figure 9:
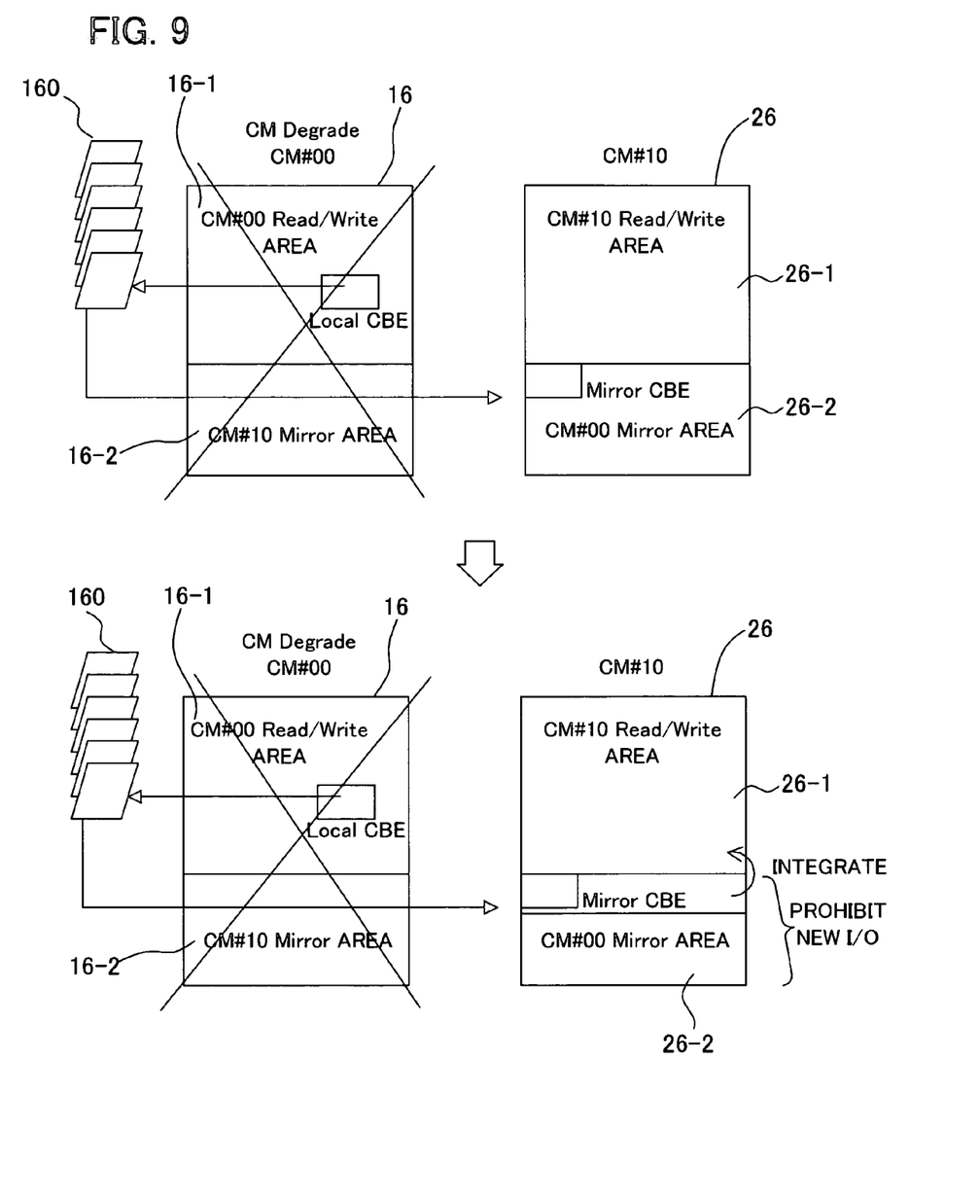
FIG. 9 is a diagram depicting the degrade processing in FIG. 1.

Therefore as FIG. 9 shows, the CPU 20 of the controller 2 checks the CBE of all the pages in the mirror area 26-2 of the cache memory 26, and integrates the mirror pages of the mirror page attributes into the local link (link of the read/write area 26-1) by the hash table.

By this, the controller 2 can execute read/write access, including a write back to the physical disk 50-1 to 50-*m* which the controller 1 has been in charge of.

The mirror area 26-2 disables use for a new read/write. By this, when the degraded controller 1 starts up, the mirror area 26-2 for the controller 1 can be secured.

[Other Embodiments]

Figure 10:
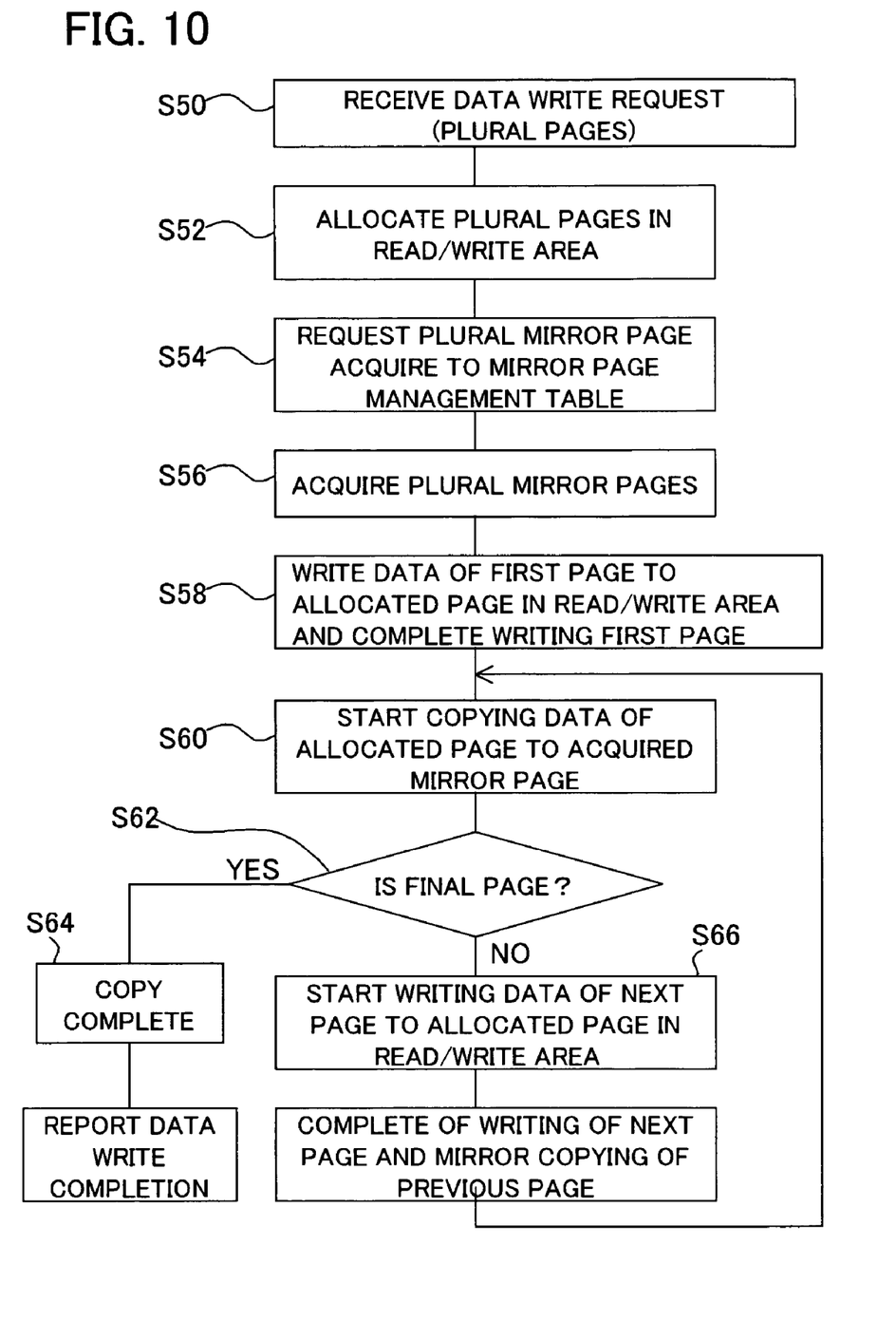
FIG. 10 is a flow chart depicting the data write processing of another embodiment of the present invention.
Figure 11:
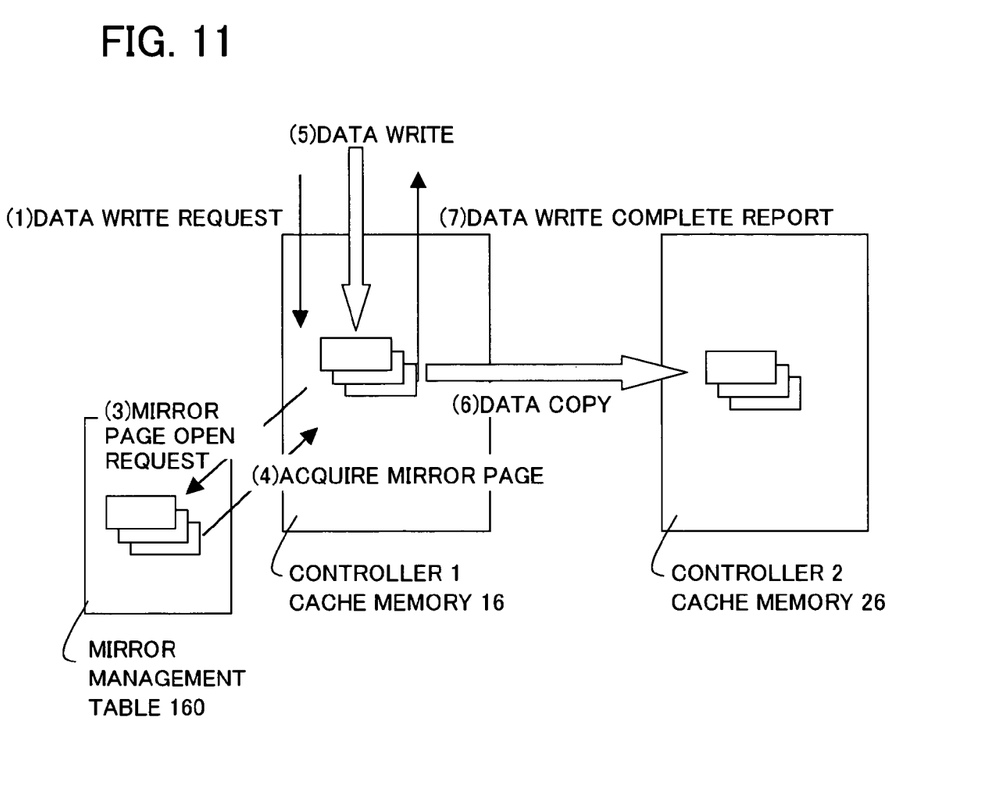
FIG. 11 is a diagram depicting operation of the data write processing in FIG. 10.

Other embodiments of the write processing of the present invention will now be described with reference to FIG. 11 according to FIG. 10. FIG. 11 shows the case when the controller 1 receives the data write request from the host, but the case when the controller 2 receives the data write request from the host is also the same.

(S50) The CPU 10 of the controller 1 receives the data write request for a plurality of pages from the host via CAs 11 and 12 ([1]).

(S52) The CPU 10 allocates a plurality of write pages in the read/write area 16-1 of the memory cache 16 ([2]).

(S54) The CPU 10 sends an acquisition request for a plurality of mirror pages in the mirror management table 160 ([3]).

(S56) The CPU 10 acquires a plurality of mirror pages in the mirror management table 160. In other words, the first open page indicated by the unused mirror pointer MP in FIG. 4 is notified to the CPU 10 as the beginning of the mirror page. And the unused mirror pointer MP is updated to the next page for the number of the notified plurality of pages from the mirror page, and the link information of the page management table MMT is updated ([4]).

(S58) Data write enabled status occurs, and the CPU 10 of the controller 1 writes the write data of the first page from the host via the CAs 11 and 12 to the first write page allocated in step S52 ([5]). In other words, the CPU 10 instructs the CAs 11 and 12 to execute the DMA transfer of the write data to the first write page in the read/write area 16-1.

(S60) The CPU 10 instructs to execute the DMA transfer of the write data to the write page, and after the writing ends, starts copying the data of the write page to the mirror page in the mirror area 26-2 of the cache memory 26 of the controller 2 ([6]). In other words, the CPU 10 instructs the PCI-node bridge circuit 30 to execute the DMA transfer of the data of the write page to the mirror page in the mirror area 26-2 of the cache memory 26 of the controller 2. By this, the data of the write page of the cache memory 16 is copied to the mirror page of the cache memory 26 via the PCI-node bridge circuits 30 and 40.

(S62) The CPU 10 judges whether the copy start page is the final page.

(S64) If the copy start page is the final page, the CPU 10 notifies the data write completion report to the host via the CAs 11 and 12 after copying completes ([7]).

(S66) If the copy start page is not the final page, on the other hand, the CPU 10 of the controller 1 writes the write page of the next page from the host via the CAs 11 and 12 to the next write page allocated in step S52. In other words, the CPU 10 instructs the CAs 11 and 12 to execute the DMA transfer of the write data to the next write page in the read/write area 16-1. When writing to the write page and copying of the copy page ends, processing returns to step S60.

In this way, the mirror management table is created with allocating the mirror area of the cache memory of the other controller, so an exchange of mirror page acquisition messages between the controllers is unnecessary, and mirroring of the write data becomes possible with decreasing the load of hardware between the controllers, particularly of the CPU. Also program operation of the other controller is unnecessary, and performance of the controller itself can be improved.

In the case of a data write operation extending over a plurality of pages, the data write operation and data copy operation involve a data transfer operation of the hardware, which is slower compared with a firmware operation, so data write to the local page of the next cache memory is operated during the data copy operation. By this, the write operation involving mirroring can become faster.

In the above mentioned embodiment, a RAID with the redundant configuration shown in FIG. 1 was used for description, but the present invention can also be applied to a storage system with another redundant configuration. For the physical disk, a magnetic disk, optical disk, magneto-optical disk and various storage device can be applied.

The present invention has been described by embodiments, but the present invention can be modified in various forms within the scope of the essential character of the present invention, and these shall not be excluded from the scope of the present invention.

In this way, in the present invention, the mirror management table is created with allocating the mirror area of the cache memory of the other controller, so an exchange of mirror page acquisition messages between the controllers is unnecessary, and mirroring of the write data becomes possible with decreasing the load of hardware between the controllers, particularly of the CPU. Also program operation of the other controller is unnecessary, and performance of the controller itself can be improved.

What is claimed is:

1. A storage control apparatus for accessing a storage device according to a data access request from a requesting apparatus, comprising:
a first controller which has a first cache memory and is in charge of a first storage device out of a plurality of storage devices; and
a second controller which has a second cache memory and is in charge of a second storage device out of said plurality of storage devices, wherein
said first controller further comprises a first mirror management table for managing allocation of a storage page in a mirror area of said second cache memory, and said second controller further comprises a second mirror management table for managing allocation of a storage page in a mirror area of said first cache memory,
wherein when said first controller receives a data write request containing write data from said requesting apparatus, said first controller allocates a page in a read/write area of said first cache memory, acquires a storage page in the mirror area of said second cache memory by referring to said first mirror management table, writes the write data from said requesting apparatus to the page allocated in the read/write area of said first cache memory, and copies the write data to the acquired page in the mirror area of said second cache memory,
and wherein said first and second controllers mutually notify the sizes of said first and second cache memories, allocate the mirror areas of said first and second cache memories according to the sizes of said first and second cache memories, and create said first and second mirror management tables from said allocation.

2. The storage control apparatus according to claim 1, wherein said first controller writes back the data, which is written in the page allocated in the read/write area of said first cache memory, to said storage device, then releases said acquired page of said first mirror management table.

3. The storage control apparatus according to claim 1, wherein when said first controller is degraded, said second controller takes charge of the storage device which said first controller is in charge of, and links the storage page in the mirror area of said second cache memory to said read/write area.

4. The storage control apparatus according to claim 3, wherein said second controller disables read/write processing to the mirror area of said second cache memory.

5. The storage control apparatus according to claim 1, wherein when said first controller receives a data write request for a plurality of pages from said requesting apparatus, said first controller allocates a plurality of pages in the read/write area of said first cache memory, acquires a plurality of storage pages in the mirror area of said second cache memory referring to said first mirror management table, writes the write data from said requesting apparatus to the allocated page in the read/write area of said first cache memory, copies the write data to the acquired page in the mirror area of said second cache memory, and writes the data of the next page to the next page allocated in the read/write area of said first cache memory during said copying.

6. The storage control apparatus according to claim 1, wherein each one of said first and second controllers comprises:
a control unit for controlling said cache memory and said storage device; and
a node channel circuit for performing direct communication between said control units.

7. The storage control apparatus according to claim 6, wherein said first control unit instructs said first node channel circuit to execute the DMA transfer of data of the page allocated in the read/write area of said first cache memory to the acquired page in the mirror area of said second cache memory, and performs said copying.

8. A storage control method for accessing a storage device according to a data access request containing write data from a requesting apparatus, comprising the steps of:
allocating a page in a read/write area of a first cache memory disposed in one controller of a pair of controllers when said one controller receives a data write request from said requesting apparatus;

acquiring a storage page in a mirror area of a second cache memory referring to a first mirror management table which is disposed in said one controller for managing allocation of a storage page in the mirror area of said second cache memory of said other controller;

writing the write data from said requesting apparatus to the page allocated in the read/write area of said first cache memory;

copying the write data to the acquired page in the mirror area of said second cache memory after said writing, mutually notifying the sizes of said first and second cache memories between both controllers;

allocating the mirror areas of said first and second cache memories according to the sizes of said first and second cache memories; and creating said first and second mirror management tables from said allocation.

9. The storage control method according to claim 8, further comprising the steps of:

writing back the data, which is written in the page allocated in the read/write area of said first cache memory, to said storage device; and releasing said acquired page of said first mirror management table when said write back completes.

10. The storage control method according to claim 8, further comprising a step of taking charge of the storage device which said one controller is in charge of by said other controller when said one controller is degraded, and linking the storage page in the mirror area of said second cache memory to the read/write area of the second cache memory.

11. The storage control method according to claim 10, further comprising a step of disabling read/write processing to the mirror area of said second cache memory.

12. The storage control method according to claim 8, further comprising a step of writing the data of the next page to the next page allocated in the read/write area of said first cache memory during said copying when said one controller receives a data write request for a plurality of pages from said requesting apparatus.

13. The storage control method according to claim 8, wherein each one of said pair of controllers comprises a control unit for controlling said cache memory and said storage apparatus, and a node channel circuit for performing direct communication between said control units.

14. The storage control method according to claim 13, wherein said copying step comprises a step of said first control unit instructing said first node channel circuit to execute the DMA transfer of the data of the page allocated in the read/write area of said first cache memory to the acquired page in the mirror area of said second cache memory and performing said copying.

15. A storage control apparatus for accessing a storage device according to a data access request from a requesting apparatus, comprising:

a first controller which has a first cache memory and is in charge of a first storage device out of a plurality of storage devices; and a second controller which has a second cache memory and is in charge of a second storage device out of said plurality of storage devices, wherein said first controller further comprises a first mirror management table for managing allocation of a storage page in a mirror area of said second cache memory, and said second controller further comprises a second mirror management table for managing allocation of a storage page in a mirror area of said first cache memory, wherein when said first controller receives a data write request containing write data from said requesting apparatus, said first controller allocates a page in a read/write area of said first cache memory, acquires a storage page in the mirror area of said second cache memory by referring to said first mirror management table, writes the write data from said requesting apparatus to the page allocated in the read/write area of said first cache memory, and copies the write data to the acquired page in the mirror area of said second cache memory, wherein one of said first and second controller manages a paging allocation of a mirror area in the other of said first and second controller, and wherein said first and second controllers mutually notify the sizes of said first and second cache memories, allocate the mirror areas of said first and second cache memories according to the sizes of said first and second cache memories, and create said first and second mirror management tables from said allocation.

* * * * *